United States Patent [19]

Akao

[11] Patent Number: 5,110,639
[45] Date of Patent: May 5, 1992

[54] PACKAGING MATERIAL FOR PHOTOSENSITIVE MATERIALS

[75] Inventor: Mutsuo Akao, Kanagawa, Japan

[73] Assignee: Fuji Photo Film Co., Ltd., Kanagawa, Japan

[21] Appl. No.: 550,558

[22] Filed: Jul. 10, 1990

[30] Foreign Application Priority Data

Jul. 13, 1989 [JP] Japan ............... 1-179040

[51] Int. Cl.⁵ .................................. B32B 3/02
[52] U.S. Cl. ........................ 428/35.2; 428/35.3; 428/35.4; 428/411.1; 428/458; 428/461; 428/480; 428/483; 428/500; 428/516; 428/522; 428/323; 428/220; 428/922; 206/328; 206/332; 206/524.6; 383/63; 383/109
[58] Field of Search ............. 428/35.2, 35.3, 35.4, 428/411.1, 458, 461, 480, 483, 500, 516, 520, 522, 323, 922, 220; 206/328, 332, 524.6; 383/63, 109

[56] References Cited

U.S. PATENT DOCUMENTS

| | | |
|---|---|---|
| 4,147,291 | 4/1979 | Akao et al. ............... 229/55 |
| 4,258,848 | 3/1981 | Akao et al. ............... 206/524.2 |
| 4,331,725 | 5/1982 | Akao ............... 428/138 |
| 4,337,285 | 6/1982 | Akao et al. ............... 428/200 |
| 4,356,224 | 10/1982 | Akao et al. ............... 428/220 |
| 4,359,499 | 11/1982 | Akao et al. ............... 428/201 |
| 4,386,124 | 5/1983 | Akao ............... 428/335 |
| 4,411,943 | 10/1983 | Akao ............... 428/161 |
| 4,411,945 | 10/1983 | Akao ............... 428/216 |
| 4,436,809 | 3/1984 | Akao et al. ............... 430/501 |
| 4,452,846 | 6/1984 | Akao ............... 428/220 |
| 4,469,741 | 9/1984 | Akao ............... 428/214 |
| 4,513,050 | 4/1985 | Akao ............... 428/200 |
| 4,565,733 | 1/1986 | Akao ............... 428/215 |
| 4,565,743 | 1/1986 | Akao ............... 428/522 |
| 4,576,865 | 3/1986 | Akao ............... 428/335 |
| 4,579,781 | 4/1986 | Akao ............... 428/461 |
| 4,584,234 | 4/1986 | Hirose et al. ............... 428/323 |
| 4,587,175 | 5/1986 | Akao ............... 428/596 |
| 4,629,640 | 12/1986 | Akao ............... 428/216 |
| 4,639,386 | 1/1987 | Akao ............... 206/316 |
| 4,653,640 | 3/1987 | Akao ............... 206/455 |
| 4,661,395 | 4/1987 | Akao ............... 428/213 |
| 4,661,401 | 4/1987 | Akao ............... 428/215 |
| 4,663,218 | 5/1987 | Akao ............... 428/212 |
| 4,687,692 | 8/1987 | Akao ............... 428/137 |
| 4,701,359 | 10/1987 | Akao ............... 428/220 |
| 4,708,896 | 11/1987 | Akao ............... 428/226 |
| 4,730,778 | 3/1988 | Akao et al. ............... 206/389 |
| 4,756,414 | 7/1988 | Mott ............... 206/328 |
| 4,778,712 | 10/1988 | Akao ............... 428/213 |
| 4,778,713 | 10/1988 | Akao ............... 428/215 |
| 4,784,906 | 11/1988 | Akao ............... 428/324 |
| 4,787,506 | 11/1988 | Akao ............... 206/395 |
| 4,796,823 | 1/1989 | Akao et al. ............... 428/98 |
| 4,828,106 | 5/1989 | Akao et al. ............... 206/316.1 |
| 4,844,961 | 7/1989 | Akao ............... 428/35.92 |
| 4,871,613 | 10/1989 | Akao ............... 428/328 |
| 4,876,125 | 10/1989 | Akao ............... 428/35.2 |
| 4,876,129 | 10/1989 | Akao ............... 428/359 |
| 4,894,264 | 1/1990 | Akao ............... 428/34.2 |
| 4,903,834 | 2/1990 | Akao ............... 206/410 |
| 4,906,494 | 3/1990 | Babinec et al. ............... 428/35.2 |
| 4,906,517 | 3/1990 | Akao ............... 428/216 |
| 4,925,711 | 5/1990 | Akao ............... 428/35.2 |
| 4,950,512 | 8/1990 | Akao ............... 428/35.8 |
| 4,960,626 | 10/1990 | Akao et al. ............... 428/36.92 |
| 4,977,033 | 12/1990 | Akao ............... 428/516 |
| 4,978,572 | 12/1990 | Akao ............... 428/323 |

FOREIGN PATENT DOCUMENTS

| | | |
|---|---|---|
| 0004151 | 9/1979 | European Pat. Off. . |
| 0009340 | 4/1980 | European Pat. Off. . |
| 0313066 | 4/1989 | European Pat. Off. . |
| 2124372 | 9/1972 | France . |

Primary Examiner—Patrick J. Ryan
Attorney, Agent, or Firm—Burns, Doane, Swecker & Mathis

[57] ABSTRACT

A packaging material for photosensitive materials which is a multilayer film comprising two coextruded multilayer inflation films wherein the amount of antistatic agent (wt. %) of an outer layer is more than 1.2 times greater than the antistatic agent content (wt. %) of a inner layer. In the packaging material of the invention, the necessary amount of antistatic agent to prevent static trouble bleeds out of the surface of the outer layer in a short time, and thereafter, the bleeding amount is almost constant. Therefore, the packaging material is excellent in heat sealability, appearance and touch and does not cause development problems.

9 Claims, 1 Drawing Sheet

PACKAGING MATERIAL FOR PHOTOSENSITIVE MATERIALS

BACKGROUND OF THE INVENTION

1. Field of the Invention

This invention relates to a packaging material for photosensitive materials such as photographic photosensitive materials.

2. Description of the Prior Art

As to the materials which are adversely affected by exposure to light, such as photographic photosensitive materials, packaging materials capable of blocking light completely are used. The packaging materials must have sufficient physical strength such as breaking strength, tear strength, impact puncture strength according to the volume and weight of a photosensitive material and heat sealing properties as well as the above light-shielding ability. Moreover, the packaging material must have antistatic ability to prevent static problems.

As conventional packaging materials having antistatic ability, there were a packaging material composed of an aluminum foil on both sides of which a polyolefin resin light-shielding film and a bleached kraft paper were laminated with an adhesive and a packaging material composed of an aluminum metallized film instead of the aluminum foil (Japanese Patent KOKAI No. 63-30482 and No. 63-247033). Another packaging material was composed of a layer containing an antistatic agent instead of the aluminum metallized film or the like.

However, in the case of the above packaging material containing an antistatic agent, the antistatic agent bleeds from the material over time so as to leave less than the amount necessary to prevent static problems. Therefore, it is inferior in heat sealability, appearance and touch and in the case that the packaging material is used for a photographic photosensitive material, the antistatic agent which bleeds from the packaging material adheres to the emulsion layer of the photographic photosensitive material to induce development problems.

SUMMARY OF THE INVENTION

An object of the invention is to provide a packaging material for photosensitive materials being excellent in heat sealability, appearance and touch and not causing development problems.

The inventor has investigated the content of antistatic agent which influences the bleeding in order to achieve the above object. As a result, they found that in the case of a multilayer film composed of not less than four layers comprising two coextruded multilayer inflation films having not less than two layers laminated to each other, when the content of antistatic agent of the outer layer is more than 1.2 times the content of the antistatic agent of the inner layer, an amount of antistatic agent to prevent static trouble bleeds out of the surface of the outer layer in a short time, and thereafter, the bleeding amount is almost constant.

Thus, the present invention provides a packaging material for photosensitive materials which is a multilayer film comprising two coextruded multilayer inflation films of which the antistatic agent content (wt. %) of the outer layer is more than 1.2 times greater than the antistatic agent content (wt. %) of the inner layer.

DETAILED DESCRIPTION OF THE INVENTION

Figure 1:
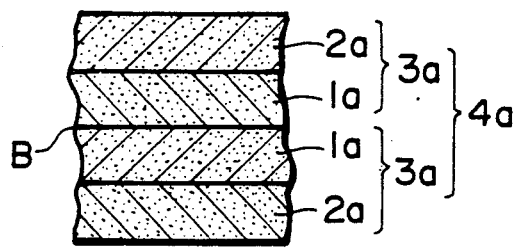
FIGS. 1 to 5 are partial sectional views illustrating layer constructions of the packaging materials embodying the invention.

The multilayer film is a coextruded multilayer inflation film, which is laminated by adhesive, blocking or the like. The lamination by blocking is preferable, because physical strength is large and the lamination can be carried out at the time of forming the film without using an adhesive.

Moreover, in the multilayer film, the antistatic agent content (wt. %) of the outer layer, which has an exposed surface, is more than 1.2 times the antistatic agent content of the inner layer, which does not has an exposed surface. When the antistatic agent content of the outer layer is less than 1.2 times, the amount of antistatic agent migrating to the inner layer is low, and the amount bleeding to the outer layer is too large.

The content of the antistatic agent in the outer layer is preferably in the range of about 0.01 to about 0.3 wt. %. Examples of the antistatic agents are described below.

(1) Non-ionic Antistatic Agent:
Alkyl amine derivative
Alkyl amide type
Polyoxyethylene alkyl amine

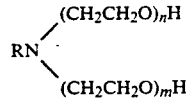

Ternary amine (laurylamine)
N,N-bis(2-hydroxyethyl cocoamine)

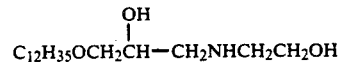

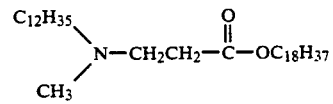

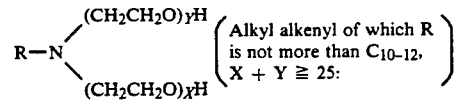

N-hydroxyhexadecyl-di-ethanol-amine
N-hydroxyoctadecyl-di-ethanol-amine
Fatty acid amide derivative
Oxalic acid-N,N'-distearylamidebutylester
Polyoxyethylene alkylamide

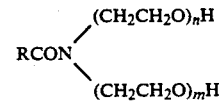

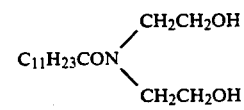

-continued

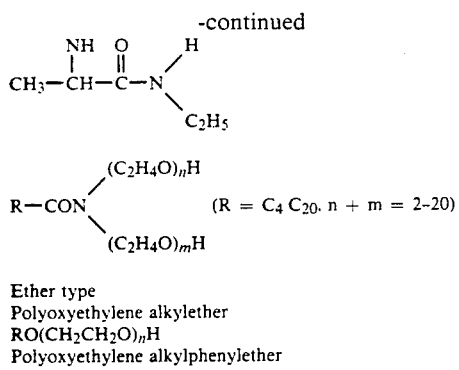

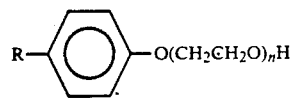 (R = C4 C20, n + m = 2–20)

Ether type
Polyoxyethylene alkylether
RO(CH$_2$CH$_2$O)$_n$H
Polyoxyethylene alkylphenylether

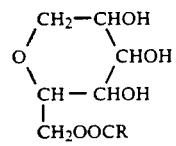

Special non-ionic type
Polyhydric alcohol ester type
Glycerine fatty acid ester
Sorbitan fatty acid ester

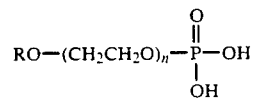

Special ester
1-hydroxyethyl-2-dodecylglyoxazoline

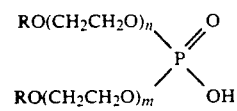

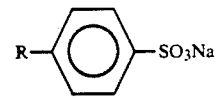

(2) Anionic Type:
Sulfoacid
Alkyl sulfonate
RSO$_3$Na
Alkyl benzene sulfonate

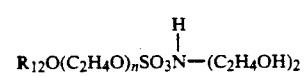

Alkyl sulfate
ROSO$_3$Na

R$_{12}$O(C$_2$H$_4$O)$_n$SO$_3$N$^H$—(C$_2$H$_4$OH)$_2$

Phosphoric ester
Alkyl phosphate
ROPO$_3$K$_2$

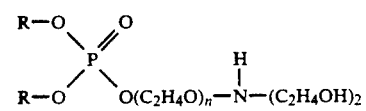

(3) Cationic Type:
Amide type cation
Quaternary ammonium salt

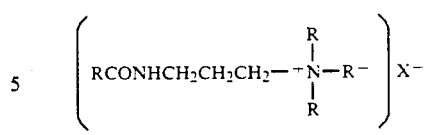

Quaternary ammonium chloride

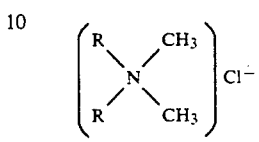

(NO$_3$—R$_{10}$·N(CH$_3$)$_3$)$^+$Cl$^-$

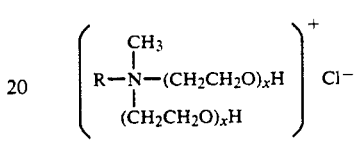

Quaternary ammonium sulfate

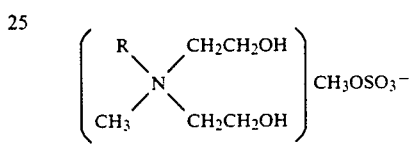

Quaternary ammonium nitrate

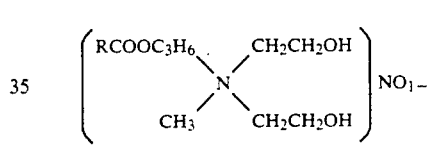

(4) Amphoteric Ionic Type:
Alkyl betaine

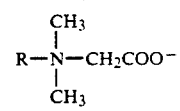

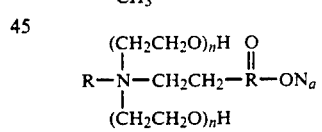

Imidazoyl
Alkyl imidazoyl

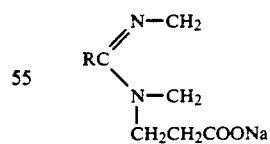

Metallic salt

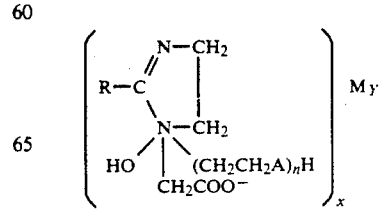

-continued

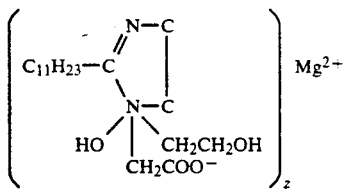

(RNR'CH₂CH₂CH₂NCH₂COO)₂MgR ≧ C, R' = H or (CH₂)ₘCOO⁻

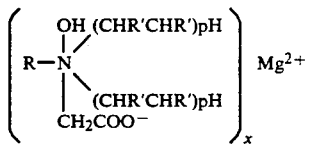

R = $C_{3-8}$ hydrocarbon, A = oxygen or imino group,
M = organic amine or metal
Akyl Alanime

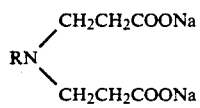

(5) Conductive Resin:
Polyvinyl benzyl cation

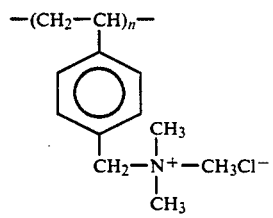

Polyacrylic acid cation

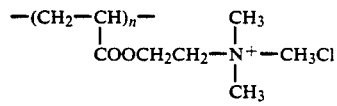

Among them, non-ionic antistatic agents are particularly preferred because of being excellent in the influence on photographic property and human organism.

Both of the outer layer and the inner layer are made of thermoplastic resin such as various polyethylene resins, ethylene copolymer resins, polypropylene resins, propylene copolymer resins, polyvinyl chloride resins, polyvinylidene chloride resins, ethylene-vinyl alcohol copolymer resins, polyamide resins, polycarbonate resins, polyester resins and modified resins thereof. The outer layer is preferably made of an ethylene copolymer resin and particularly preferably made of an ethylene copolymer resin containing more than 10 wt. % of an ethylene-α-olefin copolymer resin in view of the improvement in heat-seal ability.

The mean density of the resin of the outer layer is preferably more than the inner layer because of causing the antistatic agent from the outer layer to the inner layer more easily.

The packaging material for photosensitive materials of the invention may have any other flexible sheets in addition to the multilayer film.

To add a lubricant to the multilayer film is preferred in order to improve antistatic ability and film-forming ability and to decrease the amount of bleeding out. Suitable lubricants are described below.

Oleic acid amide lubricants:
"ARMOSLIP-CP" (Lion Akzo Co., Ltd.), "NEWTRON" and "NEWTRON E-18" (Nippon Fine Chemical Co., Ltd.), "AMIDE-O" (Nitto Kagaku K.K.), "DIAMID O-200" and "DIAMID G-200" (Nippon Kasei Chemical Co., Ltd.), "ALFLOW E-10" (Nippon Oil and Fats Co., Ltd.), etc.

Erucic acid amide lubricants:
"ALFLOW P-10" (Nippon Oil and Fats Co., Ltd.), etc.

Stearic acid amide lubricants:
"ALFLOW S-10" (Nippon Oil and Fats Co., Ltd.), "NEWTRON 2" (Nippon Fine Chemical Co., Ltd.), "DIAMID 200" (Nippon Kasei Chemical Co., Ltd.), etc.

Bis fatty acid amide lubricants:
"BISAMIDE" (Nitto Kagaku K.K.), "DIAMID-200 BIS" (Nippon Kasei Chemical Co., Ltd.), "ARMOWAX-EBS" (Lion Akzo Co., Ltd.), etc.

Silicone lubricants:
dimethylpolysiloxanes, etc. (Sinetsu Chemical Co., Ltd., Toray Silicone Co., Ltd.), etc.

Non-ionic surfactant lubricant:
"ELECTROSTRIPPER TS-2" and "ELECTROSTRIPPER TS-5" (Kao Corp.), etc.

Hydrocarbon lubricants:
liquid paraffin, natural paraffin, microwax, synthetic paraffin, polyethylene wax, polypropylene wax, chlorinated hydrocarbon, fluorocarbon, etc.

Fatty acid lubricants:
higher fatty acids preferably more than $C_{12}$, hydroxy fatty acids, etc.

Ester lubricants:
fatty acid lower alcohol esters, fatty acid polyol esters, fatty acid polyglycol esters, fatty acid fatty alcohol esters, etc.

Alcohol lubricants:
polyols, polyglycols, polyglycerols, etc.

Metallic soap:
metal salts such as Li, Mg, Ca, Sr, Ba, Zn, Cd, Al, Sn, Pb salts of higher fatty acids such as lauric acid, stearic acid, ricinoleic acid, naphthenic acid, oleic acid, etc.

A light-shielding material is added to the multilayer film in order to secure light-shielding. Examples of the light-shielding materials are described below.

Inorganic Compounds:
Oxides . . . Silica, diatomaceous earth, alumina, titanium oxide, iron oxide, zinc oxide, magnesium oxide, antimony oxide, barium ferrite, strontium ferrite, berylium oxide, pumice, pumice balloon, alumina fiber, etc.

Hydroxides . . . aluminum hydroxides, magnesium hydroxides, basic magnesium carbonate, etc.

Carbonates . . . calcium carbonate, magnesium carbonate, dolomite, dawsonite, etc.

Sulfates, sulfites . . . calcium sulfate, barium sulfate, ammonium sulfate, calcium sulfite, etc.

Silicates . . . talc, clay, mica, asbestos, glass fiber, glass balloon, glass bead, calcium silicate, montomorillonite, bentonite, etc.

Carbons . . . carbon black, graphite, carbon fiber, carbon hollow bead, etc.

Others . . . iron powder, copper powder, lead powder, tin powder, stainless steel powder, pearl pigment, aluminum powder, molybdenum sulfide, boron fiber, silicon carbide fiber, brass fiber, potassium titanate, lead titanate zirconate, zinc borate, barium metaborate, calcium borate, sodium borate, aluminum paste, etc.

Organic Compounds:

wood flour such as pine, oak and sawdust, husk fiber such as almond, peanut and chaff, colored various fibers such as cotton, jute, paper piece, cellophane piece, nylon fiber, polypropylene fiber, starch, aromatic polyamide fiber, etc.

Among them, carbon black is preferred because of decreasing a bleeding amount of antistatic agent.

Carbon blacks are divided into gas black, oil furnace black, channel black, anthracene black, acetylene black, Ketschen carbon black, thermal black, lamp black, vegetable black and animal black according to their origin. Among these, furnace carbon black is preferable in terms of light-shielding character, cost and improvement of properties. On the other hand, since acetylene black and Ketschen carbon black have an antistatic character, they are also preferable, though they are expensive. They may be blended to the furnace black in order to improve its character.

As the form of the light-shielding material, there are powder coloring agent, paste coloring agent, wet coloring agent, masterbatch pellets, dye, colored pellets, etc. Though, there are various blending method, the masterbatch method is preferred in view of cost and the contamination of the working place. Japanese Patent KOKOKU No. 40-26196 discloses a method of making a masterbatch of polymer-carbon black by dissolving the polymer in an organic solvent and dispersing the carbon black into the solution. Japanese Patent KOKOKU No. 43-10362 discloses another method of making a masterbatch by dispersing the carbon black into polyethylene.

Particularly preferable carbon black is furnace carbon black having a pH of 6 to 9, a mean particle size of 10 to 120 m $\mu$, a volatile components content of less than 2% and an oil absorption value of more than 50 ml/100 g in view of causing no adverse effects on the photographic photosensitive material, great light-shielding ability and low cost.

To add an antioxidant is preferred in order to prevent lumps of carbon black and fish eyes. Suitable antioxidants are described below.

Phenol Antioxidants:

6-t-butyl-3-methylphenol derivatives, 2,6-di-t-butyl-p-cresol, 2,6-t-butyl-4-ethylphenol, 2,2'-methylenebis-(4-methyl-6-t-butylphenol), 2,2'-methylenebis-(4-ethyl-6-t-butylphenol), 4,4'-butylidenebis(6-t-butyl-m-cresol), 4,4'-thiobis(6-t-butyl-m-cresol), 4,4-dihydroxydiphenyl-cyclohexane, alkyl group-induced bisphenol, styrene group-induced phenol, 2,6-di-t-butyl-4-methylphenol, n-octadecyl-3-(3',5'-di-t-butyl-4'-hydroxyphenyl)propionate, 2,2'-methylenebis(4-methyl-6-t-butylphenol), 4,4'-thiobis(3-methyl-6-t-butylphenol), 4,4'-buthylidenebis(3-methyl-6-t-butylphenol), stearyl-$\beta$-(3,5-di-4-butyl-4-hydroxyphenyl)propionate, 1,1,3-tris(2-methyl-4-hydroxy-5-t-butylphenyl)butane, 1,3,5-trimethyl-2,4,6-tris(3,5-di-t-butyl-4-hydroxybenzyl)benzene, tetrakis[methylene-3-(3',5'-di-t-butyl-4'-hydroxyphenyl)propionate]methane, etc.

Ketone-Amine Condensed Antioxidants: 6-ethoxy-2,2,4-trimethyl-1,2-dihydroquinoline, polymers of 2,2,4-trimethyl-1,2-dihydroquinoline, trimethyldihydroquinoline derivatives, etc.

Arylamine Antioxidants:

Phenyl-$\alpha$-naphthylamine, N-phenyl-$\beta$-naphthylamine, N-phenyl-N'-isopropyl-p-phenylenediamine, N,N'-diphenyl-p-phenylenediamine, N,N'-di-$\beta$-naphthyl-p-phenylenediamine, N-(3'-hydroxybutylidene)-1-naphtylamine, etc.

Imidazole Antioxidants: 2-mercaptobenzolimidazole, zinc salt of 2-mercaptobenzoimidazole, 2-mercaptomethylbenzoimidazole, etc.

Phosphite Antioxidants:

Alkyl-induced arylphosphite, diphenylisodecylphosphite, sodium phosphite salt of tris(nonylphenyl)-phosphite, trinonylphenylphosphite, triphenylphosphite, etc.

Thiourea Antioxidants:

thiourea derivatives, 1,3-bis(dimethylaminopropyl)-2-thiourea, etc.

Other Antioxidants:

Those useful for air oxidation, such as dilauryl thiodipropionate, etc.

Preferable antioxidants are phenol antioxidants, and particularly effective antioxidants are BHT, low volatile high molecular weight phenol antioxidants ("Irganox 1010", "Irganox 1076", trade names of Ciba-Geigy A.G., "Topanol CA", trade name of I.C.I., etc.). Two or more of phenol antioxidants and phosphite antioxidants are preferably added because of increasing the antioxidation effect.

Various additives may be added to the layers of the invention. Examples of the additives are described below.

(1) Plasticizer;

phthalic acid esters, glycol esters, fatty acid esters, phosphoric acid sters, etc.

(2) Stabilizer;

lead compounds, cadmium compounds, zinc compounds, alkaline earth metal compounds, organic tin compounds, etc.

(3) Flame retardant;

phosphoric acid esters, phosphoric acid ester halides, halides, inorganic materials, polyols containing phosphor, etc.

(4) Filler;

alumina, kaolin, clay, calcium carbonate, mica, talc, titanium dioxide, silica, etc.

(5) Reinforcing agent;

glass lobing, metallic fiber, glass fiber, glass milled fiber, carbon fiber, etc.

(6) Blowing agent;

inorganic blowing agents (ammonium carbonate, sodium hydrogen carbonate), organic blowing agents (nitroso compounds, azo compounds), etc.

(7) Vulcanizing agent;

vulcanization accelerator, acceleration assistant, etc.

(8) Deterioration preventing agent;

ultraviolet absorber, antioxidant, metal deactivator, peroxide decomposing agent, etc.

(9) Coupling agent;

silane compounds, titanium compounds, chromium compounds, aluminum compounds, etc.

(10) Nucleating agent;

organic nucleating agents (dibenzylidene sorbitol compounds, etc.), inorganic nucleating agents (calcium carbonate, etc.)

(11) Various thermoplastic resins, rubbers, etc.

The packaging material for photosensitive materials of the invention is suitable for packaging the following photosensitive materials.

Silver halide photographic photosensitive materials;

X-ray films, films for printing, monochrome and color photographic printing papers, color films, master papers for printing, DTR photosensitive materials, films and papers for computerized type-setting system, microfilms, films for movies, self-developing type photographic photosensitive materials, direct positive films and papers, etc.

Diazonium photographic photosensitive materials;

4-morpholinobenzene diazonium microfilms, microfilms, copying films, form plates for printing etc.

Azide diazide photographic photosensitive materials; photosensitive materials containing parazidobenzoate, 4,4'-diazidostilbene, etc., such as copying films and form plates for printing etc.

Quinone diazide photographic photosensitive materials;

photosensitive materials containing ortho-quinone diazide compounds or ortho-naphthoquinone diazide compounds, such as benzoquinone-(1,2)-diazido-(2)-4-sulfonic acid phenyl ether, such as form plates for printing, copying films and contact printing film, etc.

Photo polymers;

photosensitive materials, form plates for printing, contact printing films, containing vinyl compound monomer, etc.

Polyvinyl cinnamate esters;

printing films, photoresists for IC, etc.

Moreover, the packaging material of the invention is also applicable to various photosensitive materials degraded or denatured by light, oxygen, sulfur dioxide gas or the like, such as foods including peanut butter, margarine, snacks, relishes, cakes, tead and lavers, medicines including powder and granular medicines placed in a bag for stomach and bowels and for cold, dyes, pigments, photographic developing agent, photographic fixing agent, electrostatic copy toners and the like.

In the packaging material for photosensitive materials of the invention, the antistatic agent added to the outer layer of the multilayer film bleeds out in a short time to prevent static trouble and moves to the inner layer with time which inhibits further bleeding.

Representative embodiments of the above packaging material for photosensitive materials are illustrated in FIGS. 1 through 4.

The packaging material of FIG. 1 is a multilayer film 4a composed of two coextruded multilayer inflation films 3a each composed of an inner layer 1a containing a light-shielding material and an outer layer 2a containing a light-shielding material and an antistatic agent, and both inner layers 1a of two coextruded mulitlayer inflation films are laminated together by blocking B.

Figure 2:
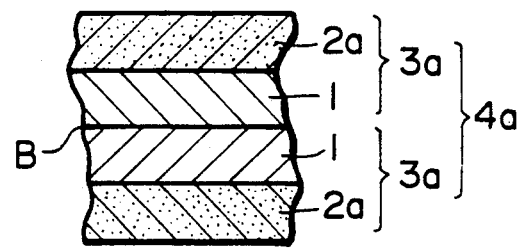

The packaging material of FIG. 2 is the same as FIG. 1, except that the inner layer 1 does not contain a light-shielding material.

Figure 3:
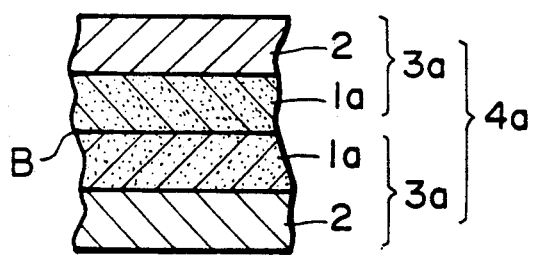

The packaging material of FIG. 3 is the same as FIG. 1, except that the outer layer 2 does not contain a light-shielding material.

Figure 4:
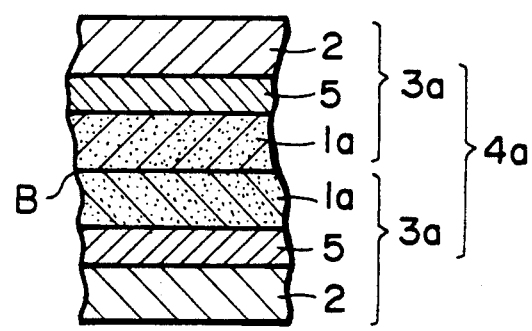

The packaging material of FIG. 4 is composed of two coextruded multilayer inflation films 3a consisting of the inner layer 1a containing a light-shielding material, the intermediate layer 5 not containing a light-shielding material and the outer layer 2 containing an antistatic agent and not containing a light-shielding material, and the inner layers 1a are laminated together by blocking B.

Figure 5:
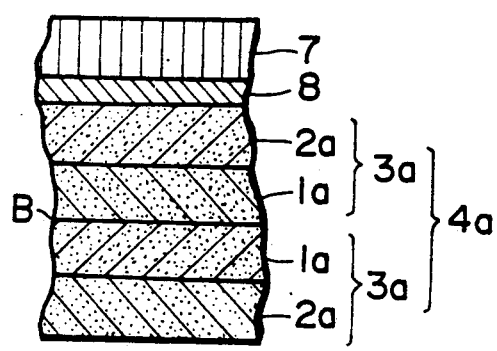

The packaging material of FIG. 5 is composed of the multilayer film 4a same as FIG. 1 and the flexible sheet 7 laminated thereto through an adhesive layer 8.

Figure 6:
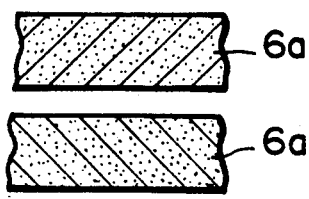
FIG. 6 is a partial sectional view illustrating layer construction of a conventional packaging material.

FIG. 6 is partial sectional view illustrating a layer construction of a conventional packaging material, which is composed of two separate light-shielding films 6a.

EXAMPLES

Example I

The packaging material of Example I corresponds to the embodiment of FIG. 1. The packaging material is a light-shielding polyolefin resin multilayer film 4a composed of two coextruded multilayer inflation film 3a adhered at the inner layers together by blocking with a peeling resistance of about 2 g/15 mm width by passing a nip roll. The coextruded multilayer inflation film 3a was a light-shielding coextruded double layer polyolefin resin film 60 μm in thickness, and the outer layer 2a was a light-shielding polyolefin resin film 30 μm in thickness composed of 30 wt. % of ethylene-4-methylpentene-1 copolymer resin having a MFR of 2.1 g/10 minutes and a density of 0.92 g/cm$^3$, 66.75 wt. % of low density homopolyethylene resin having a MFR of 2.4 g/10 minutes and a density of 0.923 g/cm$^3$, 0.2 wt. % of anionic antistatic agent (ELECTROSTRIPPER TS-3, Kao Corp.), 0.05 wt. % of erucic acid amide and 3.0 wt. % of furnace carbon black, and the inner layer 1a was a light-shielding polyolefin resin film 30 μm in thickness composed of 92.5 wt. % of ethylene-4-methylpentene-1 copolymer having a MFR of 2.1 g/10 minutes and a density of 0.92 g/cm$^3$, 4.5 wt. % of low density homopolyethylene resin having a MFR of 2.4 g/10 minutes and a density of 0.923 g/cm$^3$, and 3.0 wt. % of furnace carbon black.

EXAMPLE II

The packaging material of Example 2 corresponds to the embodiment of FIG. 2. The packaging material is a light-shielding polyolefin resin multilayer film composed of two coextruded multilayer inflation film adhered at the inner layer together by blocking with a peeling resistance of about 12 g/15 mm width with a nip roll. The coextruded multilayer inflation film was a light-shielding double layer inflation polyolefin resin film 50 μm in thickness, and the outer layer was a light-shielding polyolefin resin film 20 μm in thickness composed of 72.35 wt. % of ethylene-octene-1 copolymer having a MFR of 4.0 g/10 minutes and a density of 0.92 g/cm$^3$, 20 wt. % of homopolyethylene resin having a MFR of 1.1 g/10 minutes and a density of 0.954 g/cm$^3$, 4.5 wt. % of low density homopolyethylene resin having a MFR of 2.4 g/10 minutes and a density of 0.923 g/cm$^3$, 3 wt. % of furnace carbon black and 0.15 wt. % of anionic antistatic agent (ELECTROSTRIPPER TS-2, Kao Corp.), and the inner layer was a light-shielding very low density polyethylene resin film 30 μm in thickness composed of 72.5 wt. % of ethylene-butene-1 copolymer resin having a MFR of 1.0 g/10 minutes and a density of 0.89 g/cm$^3$, 20 wt. % of ethylene-4-methylpentene-1 copolymer resin having a MFR of 2.1 g/10 minutes and a density of 0.92 g/cm$^3$, 4.5 wt. % of low density homopolyethylene resin having a MFR of 2.4 g/10 minutes and a density of 0.923 g/cm$^3$ and 3 wt. % of furnace carbon black.

CONVENTIONAL EXAMPLE I

The packaging material of Conventional Example I corresponds to FIG. 6. The packaging material was composed of two single layer light-shielding films laminated together. The single layer light-shielding film was 100 μm in thickness and composed of 97.0 wt. % of low density homopolyethylene resin having a MFR of 2.4 g/10 minutes and a density of 0.923 g/cm$^3$ and 3 wt. % of furnace carbon black.

CONVENTIONAL EXAMPLE II

The packaging material of Conventional Example II corresponds to FIG. 6. The packaging material was composed of two single layer inflation light-shielding films laminated together. The single layer inflation light-shielding film was 100 μm in thickness and composed of 96.75 wt. % of low density homopolyethylene resin having a MFR of 2.4 g/10 minutes and a density of 0.923 g/cm$^3$, 0.2 wt. % of anionic antistatic agent (ELECTROSTRIPPER TS-3, Kao Corp.), 0.05 wt. % of erucic acid amide and 3.0 wt. % of furnace carbon black.

Various properties of the packaging material of Examples and Conventional Examples were measured, and summarized in Table 1.

TABLE 1

| | Unit | Invention | | Conventional | |
|---|---|---|---|---|---|
| | | I | II | I | II |
| Static Electrification after One Week from Film Forming | V | 60 | 90 | 750 | 60 |
| Static Electrification after One Month from Film Forming | V | 50 | 70 | 730 | 40 |
| Static Electrification by Rubbing the Outer Surfaces | V | 150 | 220 | 1020 | 160 |
| Heat Sealability after One Week from Film Forming | — | A | A | C | D |
| Heat Sealability after One Month from Film Forming | — | A | A | D | E |
| Appearance after One Month from Film Forming | — | B | B | B | D |
| Tear Strength | | | | | |
| (MD) | g | >1600 | 1060 | 315 | 308 |
| (CD) | g | >1600 | >1600 | 821 | 768 |
| Impact Strength | kg · cm | 29.5 | 31.5 | 23.5 | 22.3 |
| Antistatic Ability | — | B | B | E | B |
| Bag-Making Ability of Double Bag | — | A | A | E | E |
| Insertion Ability of Product | — | A | B | D | B |
| Dust-Free Ability | — | B | B | E | D |

Evaluation in Table 1 were carried out as follows:

| A | very excellent | B | excellent |
|---|---|---|---|
| C | practical | D | having a problem |
| E | impractical | | |

Testing method were as follows:

Static Electrification:
Voltage of the static electrification of a 50 bag stack measured the conditions of 23° C. and 65% RH by using a current collecting type electrometer ("KS-525", produced by Kasuga Denki, Inc.).

Heat Sealing Properties:
Judged by heat seal strength, hot tack properties, sealability with other materials and elapsed heat seal strength, collectively.

Appearance:
Judged by visual observation of sheen, brilliance, streaks and blots.

Tear Strength:
According to JIS P-8116

Impact Strength:
The value measured with a load of 30 kg.cm by using a film impact tester (produced by Toyo Seiki Seisakusho, Ltd.) of which the hammer head was a semisphere having a diameter a half inch.

Antistatic Ability:
A roll film, a photosensitive emulsion surface of which was disposed on the outside, was inserted into a two-sided fin seal bag, and judged by visual observation of static marks generated when the film was taken out at a rate of 50 cm/second under the conditions of 23° C. and 30% RH from the bag.

Bag-Making Ability:
Judged by heat sealability, cutting ability, folding ability and the like at the time that a two-sided fin seal flat bag of 20 cm×45 cm was produced.

Inserting ability of Product:
A two-sided fin seal bag of 20 cm×45 cm was produced, and judged by the workability at the time of inserting the roll film a photosensitive emulsion layer of which was disposed on the outside into the bag and packaging hermetically.

Dust-Free ability:
A three-sided fin seal bag was produced, 150 sheets of X ray film were inserted into the bag followed by sealing. This bag was packed in a carton, and five of these boxes were packed in a corrugated fiberboard box. The layer box was shaken according to test of JIS Z-0232. Then, judged by a amount of dust adhered to the bag.

I claim:

1. A packaging material for photosensitive materials which is a multilayer film comprising two identical coextruded multilayer inflation films each of said coextruded multilayer films being symmetrically disposed and being composed of thermoplastic resin and having an inner and an outer layer and containing a bleedable antistatic agent wherein the antistatic agent content of the outer layer is in the range of about 0.01 to about 0.3% by weight and is more than 1.2 times by weight the antistatic agent content of the inner layer.

2. The packaging material for photosensitive material of claim 1 wherein a mean density of said outer layer is more than a mean density of said inner layer.

3. The packaging material for photosensitive material of claim 1 wherein said antistatic agent is a non-ionic antistatic agent.

4. The packaging material for photosensitive materials of claim 1 wherein the two coextruded multilayer inflation films are joined to each other by blocking.

5. The packaging material for photosensitive materials of claim 1 wherein said multilayer inflation films contain a lubricant.

6. The packaging material for photosensitive materials of claim 1 wherein said multilayer inflation films contain carbon black.

7. The packaging material for photosensitive materials of claim 1 wherein said multilayer inflation films contain an antioxidant.

8. The packaging material for photosensitive materials of claim 1 wherein the thermoplastic resin is selected from polyethylene resins, ethylene copolymer resins, polypropylene resins, propylene copolymer resins, polyvinyl chloride resins, polyvinylidene chloride resins, ethylene-vinyl alcohol copolymer resins, polyamide resins, polycarbonate resins, polyester resins and modified resins thereof.

9. The packaging material for photosensitive materials of claim 1 wherein the outer layer is composed of ethylene copolymer resin.

* * * * *